Dec. 14, 1937.   A. W. WOODWARD   2,102,551
SAFETY RING FOR PNEUMATIC TIRES
Filed Nov. 30, 1934   2 Sheets-Sheet 1

Inventor
ALVA W. WOODWARD.

By

Attorney

Dec. 14, 1937.      A. W. WOODWARD      2,102,551
SAFETY RING FOR PNEUMATIC TIRES
Filed Nov. 30, 1934      2 Sheets-Sheet 2

Inventor
ALVA W. WOODWARD.

By

Attorney

Patented Dec. 14, 1937

2,102,551

UNITED STATES PATENT OFFICE 2,102,551

SAFETY RING FOR PNEUMATIC TIRES

Alva W. Woodward, Kent, Ohio, assignor to Wingfoot Corporation, Wilmington, Del., a corporation of Delaware Application November 30, 1934, Serial No. 755,289

19 Claims. (Cl. 152—10)

This invention relates to an improvement in pneumatic tires and, more particularly, to a safety ring for such tires to prevent an axle let-down in case of deflation of the tire by puncture or blow-out.

Various constructions for safety rings are known which, however, are not entirely satisfactory. One of the disadvantages was the difficulty of placing the safety ring inside the tire casing because of the relatively large outside diameter of the ring. On account of that the safety ring was made up in sections or segments to make assembling of the tire easier. This method is especially necessary when the safety ring is made of a relatively non-flexible material like wood or metal. In segmentary rings, however, it was necessary to fasten the ring sections by bolts or the like to the tire rim to keep them in proper position. To avoid bolting and other complicated structures of known practice the present invention solves the placing of the safety ring sections in the tire by a very efficient and simple method which answers all practical purposes.

This invention is applicable to all vehicles equipped with pneumatic tires and is particularly useful for heavy automobiles, like busses and trucks, and also for rail vehicles. The safety ring, preferably made from extruded soft aluminum alloy bars, rests on the tire rim and extends radially outwardly inside the tire so as to prevent the tire from collapsing too much in case of deflation. When riding on the safety ring, the car can be driven for some distance until a convenient place is available for changing tires without danger of damaging the tire.

An object of this invention is to provide an improved, novel safety ring in which the sections are held in a firm position without fastening them to the tire rim.

Another object of the invention is the provision of a safety ring which can be readily and positively assembled in any tire and rim by an unskilled workman without special tools.

In order to better understand the nature of this invention reference may now be had to the accompanying drawings of which:

Figure 1:
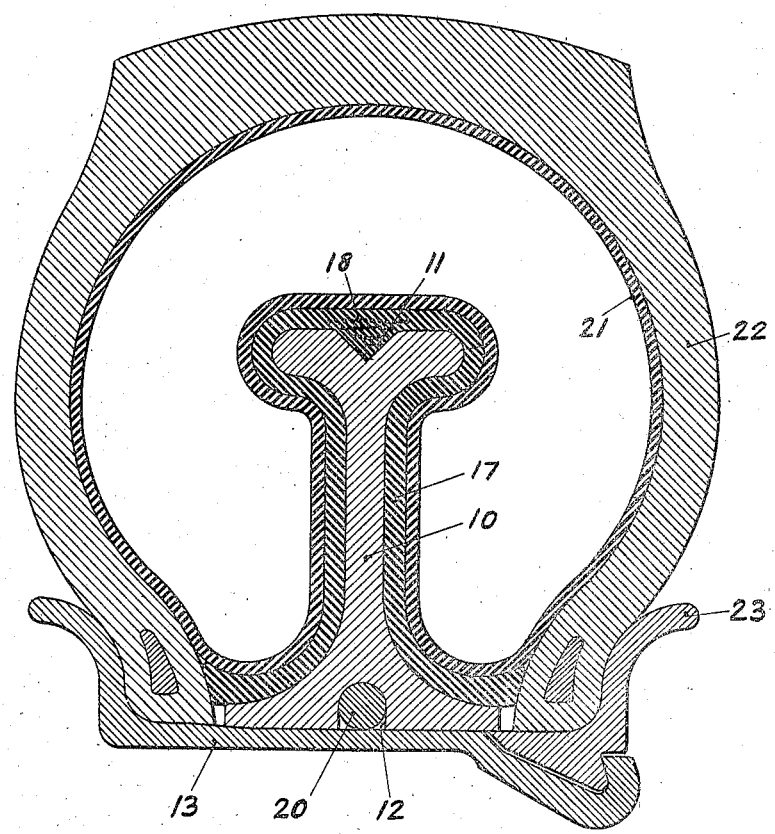
Fig. 1 is a cross-sectional view through a pneumatic tire embracing the invention.
Figure 3:
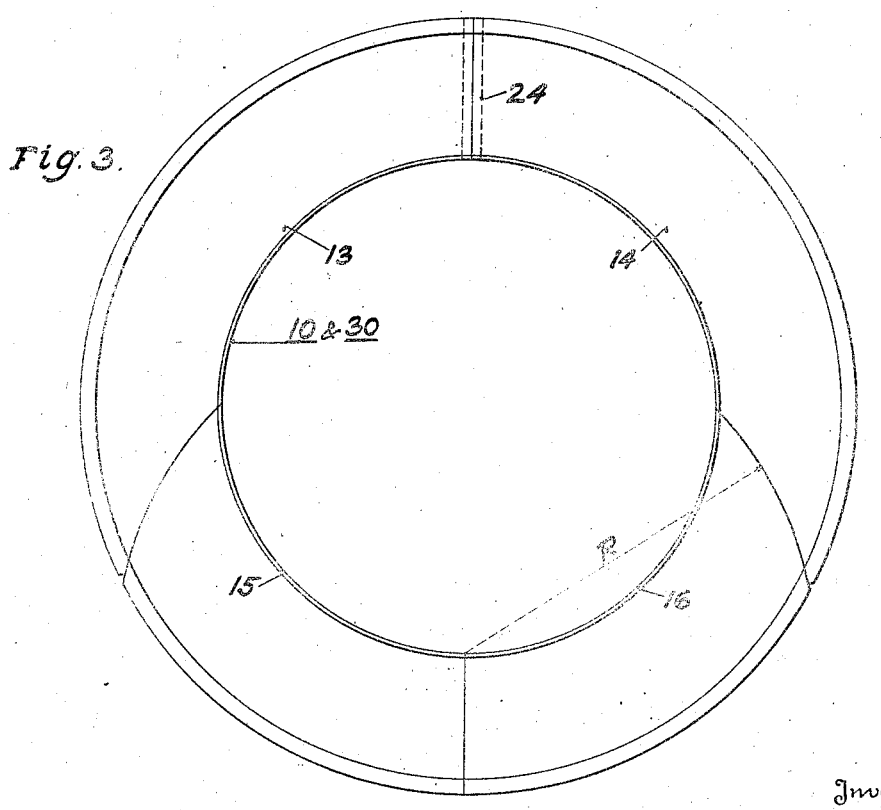
Fig. 3 is a side view of a safety ring constructed in accordance with the invention.

Referring to Fig. 1, the safety ring shown generally at 10 is of I-shaped cross-section and is provided with circumferential grooves 11 and 12. The ring is split into preferably four sections, 13, 14, 15 and 16, by two straight radial and by two circular angular cuts as shown in Fig. 3, thereby dividing the inside diameter in four equal spaces. The circular cuts are prescribed about a point lying on the vertical center and on the inside diameter of the safety ring and this radius has been marked with the letter R. A hole 24 is provided in the safety ring along a split of the sections to receive an air valve. This construction permits inserting the ring into the reinforced annular rubber flap 17 without clearance between the sections after the ring is assembled.

The flap 17 is provided on the inside of its largest circumference with reinforced wire beads 18 which are vulcanized to or in the rubber, thereby providing a stretchless, endless retaining member. This reinforced portion of the flap fits into the outer groove 11 of the ring 10 and holds the ring sections in firm position. A split snap ring 20 fits into the inner groove 12 of the safety ring, providing additional holding means for the ring section. The rubber flap 17 serves also as a cushion for the air or inner tube 21 by which it is surrounded and which in turn is enclosed by the tire casing 22. The side split ring 23 locks the assembled tire to the rim 13. Of course the safety ring assembly is adapted for any standard type of rim, as will be understood.

The base of the safety ring is approximately as wide as the width between the beads of the tire casing, allowing a small clearance, and the edges of the rubber flap, which may be slightly enlarged, fit closely between the beads. This construction permits the tire casing limited movement to adjust itself to the forces acting thereon and prevents breaking of the casing as against a fixed grip of the tire beads and ring.

Figure 2:
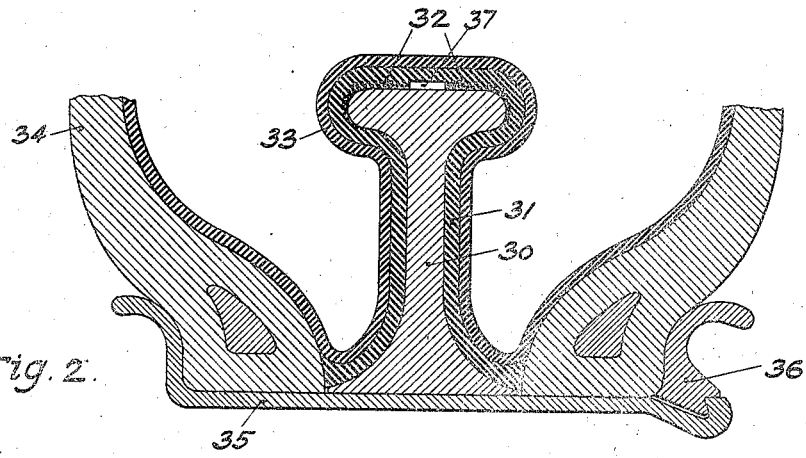
Fig. 2 is a fragmentary cross-sectional view of a tire illustrating a modification of the invention shown in Fig. 1.

The modification of the safety ring construction seen in Fig. 2 is a simplified arrangement of that shown in Fig. 1. The safety ring 30 is of the same general construction as that represented in Fig. 1, but omits the grooves 11 and 12 and their associated parts. For securing the ring sections together, the flap 31 surrounding the ring is provided on the inside with circumferential wire bead reinforcements 32 which are vulcanized to or in the flap and are separated by a space 37 sufficiently wide to accommodate the air valve of the inner tube. Thus at one point in the flap a valve-receiving hole is pierced completely through the flap. At the same time the omission of the reinforcement at the center of the flap will make the latter more pliable to facilitate insertion of the safety ring sections therein. It should be understood, however, that the valve of the inner tube may be placed elsewhere in the assembly with appropriate alterations in the structure. The air or inner tube 33 and the tire casing 34 surrounding the safety ring are secured to the rim 35 by the split side ring 36. As above, any standard type of rim can be used.

From the foregoing description it will be apparent that the present invention provides a considerable improvement in the assembling of the safety ring and in mounting the assembled tire on its rim, which can be of conventional type without requiring any change.

Although I have illustrated only two forms which the invention may assume and have described these types in detail it will be apparent to those skilled in the art that the invention is not limited thereto but that various modifications may be made therein without departing from the spirit of the invention or from the scope of the appended claims.

What I claim is:

1. In combination with a pneumatic tire, a tire rim mounting the tire, a safety ring consisting of a plurality of sections resting on said tire rim, and an annular bead wire reinforced rubber flap enclosing and holding the ring sections in firm position around the rim and within the tire, said bead-wire reenforcing being arranged about the periphery of said safety ring to hold said sections against said rim.

2. In combination with a pneumatic tire, a tire rim mounting said tire, a safety ring consisting of a plurality of sections resting on said tire rim within the tire, an annular rubber flap enclosing and holding the ring sections in firm position by bead wire reinforcements vulcanized to the inside of the outer portion of the circumference of the rubber flap which rests against the portion of said ring on which the tire rests when the same is deflated and under load.

3. In combination with a pneumatic tire, a tire rim, a safety ring having I-shaped cross-section and consisting of a plurality of sections resting on said tire rim, an annular rubber flap enclosing and holding the ring sections in firm position by beadwire reinforcements vulcanized to that portion of the flap against which the tire will bear in a deflated position, the bead wire forming a continuous annular, substantially inextensible band about the periphery of said sections to hold them against outward movement under centrifugal force.

4. In combination with a pneumatic tire, a tire rim mounting the tire, a safety ring inside the tire and positioned against the rim and having circular grooves in the center of its inside and outside diameters and being divided into a plurality of sections, an endless annular reinforced rubber flap enclosing and holding the ring sections in firm position with a portion of the flap engaging in the outer groove of the safety ring and a snap ring fitting into the inner groove of the safety ring and further locking the ring sections together.

5. In combination with a pneumatic tire, a tire rim mounting the tire, a safety ring consisting of a plurality of sections resting on said rim, and an annular rubber flap reinforced on the inside of its outer portion by at least two spaced wire beads vulcanized to the rubber flap, the wire beads being in close superimposed relation with the outside diameter of the safety ring to prevent the flap from expanding and to hold the ring sections in firm position around the rim and within the tire.

6. A safety ring for a pneumatic tire of I cross-section and consisting of a plurality of segments, a conventional tire rim supporting the safety ring which extends substantially the width between the tire beads, an annular rubber flap closely surrounding the remaining surface of the safety ring and fitting snugly between the tire beads and the safety ring and wire bead reinforcements vulcanized to the inside of the outer portion of the flap and holding the safety ring sections in firm position.

7. A safety ring for a pneumatic tire consisting of four segments, two of the segment division lines being substantially radial and the two other division lines being substantially on a circle, the center of which is at the intersection of the inner diameter of the safety ring with the radial division lines.

8. A safety ring of I-shaped cross section for a pneumatic tire consisting of four segments, a rubber flap enclosing and holding the ring segments in firm position by wire bead reinforcements spaced symmetrically from the center of the ring and embracing the outer flange of the I section, the wire beads being vulcanized to the rubber flap.

9. In combination, a pneumatic tire, a rim mounting the tire, a multi-part safety ring within the tire and mounted on the rim, and annular means for securing the safety ring in position, said means comprising a flap, reinforced with substantially inextensible annular elements arranged about the periphery thereof, with the flap covering substantially the entire surface of the ring not contacting the rim.

10. The combination recited in claim 9 wherein further, the base of the safety ring and the edges of the flap substantially fill the space between the beads of the tire.

11. In combination, a pneumatic tire, a rim mounting the tire, a multi-part safety ring within the tire and mounted on the rim, and annular means for securing the safety ring in position, said means comprising a flap reinforced with substantially inextensible elements arranged about the periphery thereof.

12. In combination, a pneumatic tire, a rim mounting the tire, a multi-part safety ring within the tire and mounted on the rim, and annular inextensible means arranged peripherally of said ring for securing the safety ring in position.

13. In combination with a pneumatic tire including an inner tube, a tire rim mounting the tire, a safety ring comprising a plurality of sections seated on said tire rim and having a tread portion for supporting the tire rim when the tire is deflated, an annular rubber flap enclosing the ring sections for protecting said inner tube, and an annular metallic non-extensible wire bead incorporated in said flap and surrounding the tread portion of said ring for positively maintaining the sections thereof against radial displacement under centrifugal action.

14. In combination with a pneumatic tire including an inner tube, a tire rim mounting the tire, a safety ring comprising a plurality of sections seated on said tire rim and having a tread portion for supporting the tire rim when the tire is deflated, an annular rubber flap enclosing the ring sections for protecting said inner tube and an annular metallic non-extensible wire bead incorporated in said flap and surrounding the tread portion of said ring for positively maintaining the sections thereof against radial displacement under centrifugal action, said flap having an internal annular rib engageable with a groove in said tread portion to prevent lateral displacement of said flap and sections.

15. In combination, a pneumatic tire, a rim upon which said tire is mounted, a safety ring embracing said rim and arranged between the side walls of said tire, a flap closely embracing said ring, interlocking means on said ring and flap for preventing lateral shifting movement of said flap relative to said ring.

16. In combination, a pneumatic tire, a rim upon which said tire is mounted, a safety ring embracing said rim and arranged between the side walls of said tire, and a removable locking ring arranged about the periphery of said rim, said safety ring having means arranged on opposite sides of said locating ring for engaging said locating ring to prevent lateral shifting movement of said safety ring laterally of said ring.

17. In combination, a pneumatic tire, a rim upon which said tire is mounted, a safety ring embracing said rim and arranged between the side walls of said tire, and a removable locking ring arranged about the periphery of said rim, said safety ring having means arranged on opposite sides of said locating ring for engaging said locating ring to prevent lateral shifting movement of said safety ring laterally of said ring, said removable locating ring being a snap ring.

18. In combination with a pneumatic tire, a tire rim upon which the tire is mounted, a safety ring inside the tire positioned against the rim and having a circular groove in the side thereof adjacent said rim and being divided into a plurality of sections, an endless annular reenforced rubber flap enclosing and holding the ring sections against said rim, and a locating ring arranged about the periphery of said ring and arranged within said recess to prevent lateral shifting movement of said sections relative to each other and to locate said ring in proper position peripherally of said rim.

19. In combination with a pneumatic tire, including an inner tube of a tire rim mounting the tire, a safety ring comprising a plurality of sections seated on said tire rim and having a tread portion for supporting the tire rim when the tire is deflated, an annular flap of flexible material enclosing the ring sections for protecting said inner tube, and a substantially inextensible annular member incorporated in said flap and surrounding the tread portion of said ring for positively maintaining the sections thereof against displacement under centrifugal action, and interlocking means between said flap and sections for preventing lateral shifting movement of said flap relative to said sections.

ALVA W. WOODWARD.